Nov. 3, 1925.
N. A. CHRISTENSEN
1,560,041
COMPRESSOR CONTROL
Filed April 9, 1924
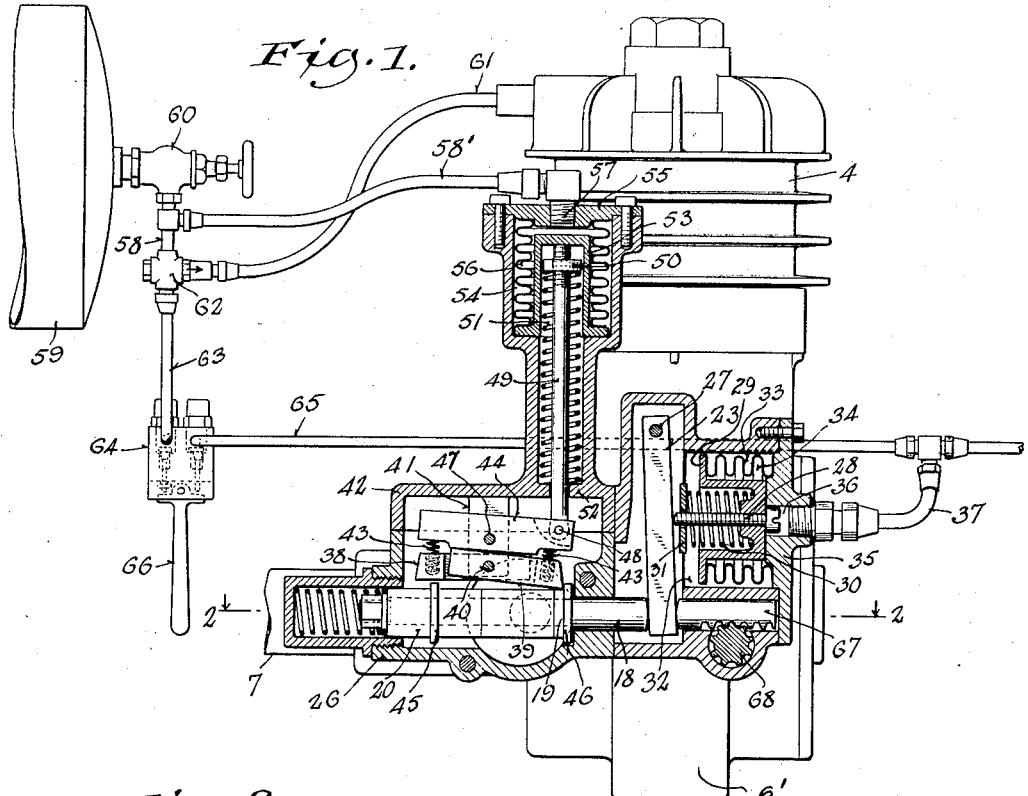
Fig. 1.
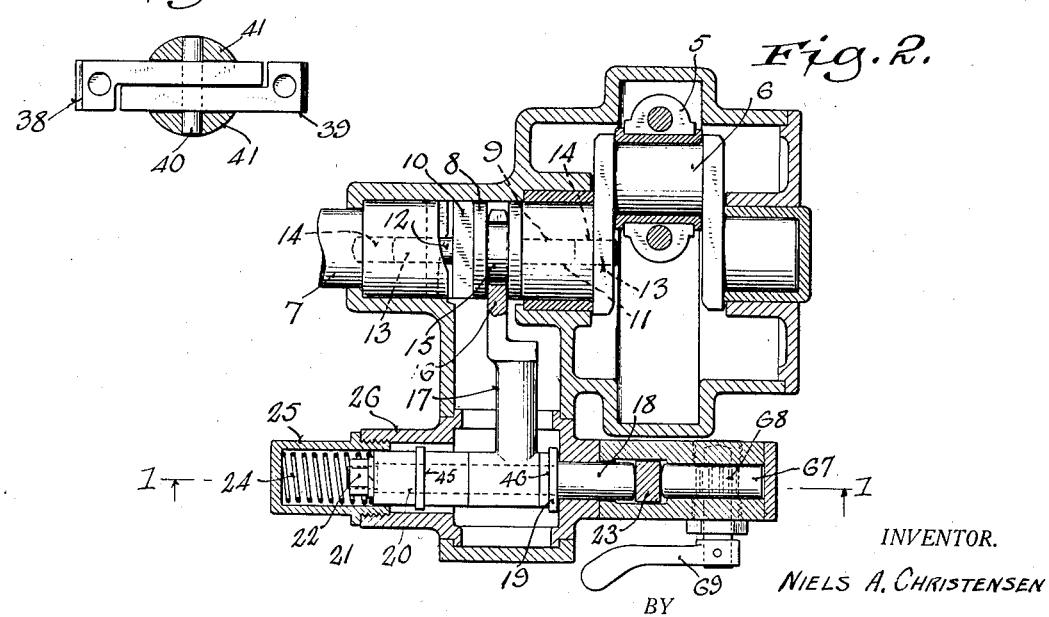
Fig. 3.
Fig. 2.
INVENTOR.
NIELS A. CHRISTENSEN
BY
Quarles & French
ATTORNEYS.

Patented Nov. 3, 1925.

1,560,041

UNITED STATES PATENT OFFICE.

NIELS A. CHRISTENSEN, OF MILWAUKEE, WISCONSIN.

COMPRESSOR CONTROL.

Application filed April 9, 1924. Serial No. 705,364.

*To all whom it may concern:*

Be it known that I, NIELS A. CHRISTENSEN, a citizen of the United States of America, and resident of Milwaukee, in the county of Milwaukee and State of Wisconsin, have invented new and useful Improvements in Compressor Controls, of which the following is a description, reference being had to the accompanying drawings, which are a part of this specification.

The invention relates to air compressors, and more particularly to governing means therefor.

In compressor equipment for furnishing compressed air to a tank used for starting air for the starting system of an internal combustion engine, or used in connection with airbrakes for automotive vehicles wherein the compressor is driven by the engine of the vehicle, provision should be made for governing the compressor to prevent the pressure of air in said tank becoming excessive. One way of governing the compressor is to arrange for clutching and declutching the compressor shaft with or from a shaft driven by the engine, and it is to this type of compressor governor that this invention relates.

This application, as to common claimable subject matter between it and my copending application Serial No. 453,798, filed March 19, 1921, is in part a division of said prior application.

The present application also includes improvements over the aforementioned copending application in that provision is made for automatically holding the compressor shaft in driving engagement with its drive shaft when a minimum pressure in the reservoir has been reached.

The invention further consists in the several features hereinafter set forth and more particularly defined by claims at the conclusion hereof.

In the drawings: Fig. 1 is a vertical sectional view through the governor, showing it associated with a compressor and a pressure system;

Fig. 2 is a detail sectional view taken on the line 2—2 of Fig. 1;

Fig. 3 is a detail sectional view taken on the line 3—3 of Fig. 1.

In the drawings the numeral 4 designates a compressor of any suitable construction which is equipped with inlet and discharge valves in its head, and has a piston working in its cylinder operatively connected by a connecting rod 5 with its crank shaft 6 journalled in a crank-case 6', such construction of compressor being of so well known construction that the crank shaft only is shown, as it is upon this member that the governing mechanism embodying the invention acts. This crank shaft is adapted to be operatively connected to a drive shaft 7 through a shiftable clutch element 8. At its ends the clutch member 8 is formed with tongues 9 and 10 for engagement with corresponding cross-grooves 11 and 12 in the adjacent end portions of the crank shaft 6 and the drive shaft 7, respectively, and such shiftable member is always maintained in an alined position relative to the shafts 6 and 7 by pins 13 projecting from the tongues and in the alined openings 14 in said shafts. The movement of this shiftable member is such that, while at all times it is connected to the crank shaft, it has a movement to release the tongue 10 from the clutch face and groove 12 of the drive shaft 7 so that said drive shaft may continue to revolve without driving the compressor, the shiftable member being provided with an annular groove 15 receiving the fork 16 of a clutch-shifting member 17 whose movement is controlled by the governing mechanism.

The clutch-shifting member 17 is mounted on a governor-controlled shaft 18 between stop collars 19 and 20 mounted on said shaft and secured thereto by a nut 21 mounted on the outer threaded end 22 of said shaft, said shaft being engaged at one end by a shifting lever 23 and at its other end by a spring 24 constantly acting to move said shaft against said lever and bearing against an end cap 25 in the casing 26 for said shaft.

The shifting lever 23 is pivotally mounted at 27 and is adapted to be engaged by a screw or abutment 28 which is moved by fluid-pressure in the brake or starter system, that is, the pressure system, to shift said lever 23 toward the driving shaft 7 and thereby shift the shaft 18 and the clutch-shifting member 17 so as to move the clutch member 8 into driving engagement with the shaft 7. Abutment 28 is here shown in the form of a screw carried by a cap member 29 which is normally maintained in a release position by a spring 30 interposed between said cap and a fixed plate 31 having a hole through which the screw 28 moves. The cap is mounted to move in a bore 32 of the casing of the machine and cooperates with a sylphon bellows 33 and an end plate 35 to form a diaphragm chamber 34, said bellows being connected at one end to the flanged end of said cap 29 in a fluid-tight manner, and its other end in a fluid-tight manner to the end plate 35 which has a pipe opening 36 receiving piping 37 connecting with a pipe 65 of the pressure system either for the starter system or for the brake system, or both, of the automotive vehicle so that air under the pressure in said system will enter the chamber 34 and under certain conditions move the cap member 29 and consequently the screw 28 to shift the lever 23 toward the left when viewed as shown in Fig. 1, so as to throw in the clutch for the compressor, as previously described. This occurs when the air brake pressure in the reservoir is at a minimum and consequently the compressor upon being connected with the drive shaft 7 is allowed to build up the required pressure in the reservoir.

The pressure in the starting and braking system is not always on, as it is only on when the starting button or brake-control valve is operated, as will be understood from the disclosure of my copending application Serial No. 453,798, hereinbefore referred to and the control valve 66 herein shown, as the brakes are not on constantly, with the result that the braking pressure only tends to move the lever 23 to throw in the clutch for the compressor at intermittent periods, and consequently the spring 24 at the end of the shaft 18 always acts to shift the shaft 18 toward the right and hence move the clutch-shifting member 17 in the same direction and thereby release the clutch element 8 from driving engagement with the clutch face 12 of the shaft 7. Thus, it will be understood that means have been provided for normally moving the clutch member out of engagement with its driving shaft so that the compressor is not driven and that other mechanism or means influenced by the action of the pressure in the brake or starting system is used to shift the clutch element into driving engagement with the compressor. It, therefore, is desirable to provide some means for maintaining the clutch-shifting lever or member 17 in a position to either hold the clutch element 8 in engagement with the drive shaft 7 or to hold said element out of engagement with said member 7, and for this purpose mechanism is provided depending for its operation upon the pressure in the reservoir.

This mechanism includes a pair of triggers 38 and 39 pivotally mounted on a pin 40 carried in ears 41 on a cap member 42 of the casing 26 and having their free ends normally urged by springs 43 interposed between them and an operating lever 44 toward the shaft 18, the finger 38 being adapted to cooperate with a stop shoulder 45 formed by a flange on the collar member 20 and the finger 39 being adapted to cooperate with the annular stop shoulder 46 formed by a flange on the collar 19, the engagement of the finger 39 with the collar 46 acting to normally hold the shaft 18 in a clutch throw-out position to which it has been moved by the spring 24, while the engagement of the finger 38 behind the stop 45 acts to hold the shaft 18 against the pressure of the spring 24 in a position to maintain the clutch element 8 in engagement with the drive shaft.

The position of these fingers, however, relative to the stop collars is determined by the position of the lever 44, as said fingers are mounted to swing with, and be engaged by, said lever. The lever 44 is pivotally mounted intermediate its ends on a pin 47 also carried in the member 42 of the casing and at one end is connected by pin 48 with a rod 49. This rod 49 carries a nut 50 and a spring 51 is interposed between said nut and a shoulder 52 formed by the casing whereby said spring 51 normally acts to hold the rod 49 in a position in which the lever 44 has moved trigger 38 down into position for contact with the stop shoulder 45 to thereby hold the clutch element 8 in engagement with the drive shaft 7 for operation of the compressor. This action of the spring 51, however, is opposed by the pressure in the reservoir effected in the following way: A cap member 53 bears against the end of rod 49 and forms with the sylphon bellows 54 and an end plate 55 an air chamber 56, said bellows being connected at one end with a flange on the cap 53 and at its other end with the end plate 55, in a fluid-tight manner, said end plate having an opening 57 connected by piping 58 and 58' to the reservoir or supply tank 59, a manually operable shut-off valve 60 being here shown between the reservoir 59 and the piping 58'. The discharge valve of the compressor, as usual, allows the air to pass into a discharge pipe 61 which is connected beyond a check valve 62 with the pipe 58' which leads to the reservoir 59. Where the supply tank is used to furnish air to a brake system, I have shown the pipe 63 leading to a control valve 64 which controls the passage of air to a pipe 65 leading to the fluid-pressure-operated brakes of the vehicle, the movement of the handle 66 allowing air to be introduced through the pipe 63 to the pipe 65, or cutting off the supply of air from the pipe 63 and allowing the air from the brake-system to return through the pipe 65 to atmosphere, the detail construction of which valve has not been shown as it forms the subject matter of a separate copending application filed by me; the one thing necessary for the understanding of this invention being that the pressure of air in the "pressure system", the term "pressure system" meaning either the starter system with the starter valve adapted to be connected with the reservoir through pipe 63, as shown more in detail in the aforesaid copending application, or in the brake system as here shown, from which the compressed air is taken and used through the intermittent operation of the starter valve or brake-control valve operated by the operator of the vehicle, is used to effect the shifting movement of the clutch element 8 in one direction, that is, to connect the compressor with its drive shaft.

The pressure of air in the chamber 56 being always the same as that of the pressure in the reservoir, and the spring 51 working in opposition to this reservoir pressure, said spring is so designed as to prevent movement of the cap member 53 and consequently said rod 49 until a certain pressure has been built up in the reservoir 59, after which this pressure overcoming the spring 51 causes the rod 49 to move downwardly, thereby shifting the finger 39 into position for engagement with the stop collar 46 and, as shown, such engagement has taken place due to the fact that the spring 24 has shifted the member 18 toward the right, and under such conditions the clutch element 8 is thrown out of engagement with the drive shaft 7. However, should the pressure in the reservoir 59 become reduced by the use of the air in the starting or the braking system, or in any other way become reduced to a predetermined minimum volume, then the spring 51 assumes supremacy and moves the rod 49 upwardly, thereby releasing the finger 39 from the position shown in Fig. 1 and moves the finger 38 into position for engagement with the stop shoulder 45 which it engages as soon as a temporary pressure is set up in the brake or starting system sufficient to overcome the action of the spring 24, and then the clutch element 8 will be shifted so as to engage the drive shaft 7 and the compressor will be coupled up and driven until such time as the pressure in the chamber 56 again overcomes the action of the spring 51. It will, therefore, be noted that by the use of two triggers whose position is controlled by the pressure in the reservoir, that the shaft 18 which controls the shifting of the clutch element 8 is held in either of two positions; in one the compressor being out of action and the other being in action whereby the reservoir pressure is maintained within certain limits.

In case the pressure in the reservoir is insufficient to furnish sufficient air pressure to operate the lever 23, or in case such mechanism for operating said lever is out of order, a rack 67 meshing with a pinion 68 on a shaft provided with a handle arm 69 may be manually shifted to engage said lever 23 and thereby move the shaft 18 to throw in the clutch for driving the compressor.

For the purpose of the claims I will use the term "pressure system" as indicating either the braking or the starting system.

I desire it to be understood that this invention is not to be limited to any specific form or arrangement of parts except in so far as such limitations are specified in the claims or made necessary by the prior art.

What I claim as my invention is:

1. The combination with a pressure system, a compressed air reservoir supplying air to said system, a drive shaft and a compressor connected with said reservoir, of a clutch for operatively connecting or disconnecting the compressor with said shaft, clutch-shifting means, means tending to move said clutch-shifting means to shift the clutch out of engagement with said shaft, means operable by the pressure in said pressure system for moving said clutch-shifting means to shift the clutch into engagement with said shaft, a latch for holding the clutch in engagement, a latch for holding the clutch out of engagement, and means responsive to the pressure in the reservoir for controlling the operation of said latches.

2. The combination with a compressed air reservoir, a drive shaft and a compressor connected with said reservoir, of a clutch for operatively connecting or disconnecting the compressor with said shaft, and means operable within certain predetermined limits of pressure in the reservoir to automatically shift and hold said clutch in and out of operative driving connection with said shaft whereby said compressor is positively operated to build up pressure in the reservoir to a predetermined maximum limit and is positively stopped from operation by said drive shaft until the pressure in the reservoir reaches a predetermined minimum limit.

3. In a compressed air system, the combination with a compressed air reservoir, a drive shaft and a compressor connected with said reservoir, of a clutch for operatively connecting or disconnecting the compressor with said shaft, clutch-shifting means, means for operating said clutch-shifting means, and a pair of latches, one of said latches operating to hold said clutch in a driving position and the other to hold said clutch in a disconnected position.

4. In a compressor governor, the combination with a clutch for the compressor and a clutch-shifting shaft, of a pair of holding members alternately engageable with said shaft, one of said members operating to hold said shaft in a position in which the clutch controlled thereby is operative and the other of said members operating to hold said shaft in a position in which the clutch controlled thereby is inoperative, and fluid-pressureoperated means for controlling the operation of said holding members.

5. The combination with a compressed air system, including a reservoir, compressor and a drive shaft, of a clutch for operatively connecting and disconnecting the compressor with said shaft, clutch-shifting means, means for operating said clutch-shifting means, a pair of pivoted latches alternately operative to hold said clutch in and out of driving position, a pivoted operating member, spring means connecting said member with each of said latches, and means responsive to the pressure in said system for moving said operating member.

In testimony whereof I affix my signature.

NIELS A. CHRISTENSEN.